Dec. 6, 1938. J. WEISBAUM Re. 20,942

NECKTIE

Original Filed March 5, 1936

INVENTOR.
JACK WEISBAUM.
BY Allen & Allen
ATTORNEYS.

Reissued Dec. 6, 1938

Re. 20,942

UNITED STATES PATENT OFFICE 20,942

NECKTIE

Jack Weisbaum, Cincinnati, Ohio

Original No. 2,051,322, dated August 18, 1936, Serial No. 79,957, May 15, 1936, which is a division of Serial No. 67,345, March 5, 1936. Application for reissue April 27, 1938, Serial No. 204,700

7 Claims. (Cl. 2—146)

My invention relates to improvements in necktie construction.

In the manufacture of neckties it has been the custom in the past to lay a plurality of plies of material on the cutting table, and in accordance with a predetermined pattern, to cut through a number of successive layers at the same time. This makes a desired number of ties with various kinds of material which may be made up in the same manner, and the ties will accordingly all be the same size.

There are a great many different styles of neckties, both of the four-in-hand and bow type, and there are various plans of folding the material and inserting linings in the ties.

Heretofore the silk or other fabric from which the ties are made is usually such that it must be blocked before the tie can be made up. In the parent application, Serial No. 67,345, filed March 5, 1936, issued as Patent No. 2,131,545, September 27, 1938 of which this forms a division, I have described necktie pressing mechanism and a method applicable for manufacturing four-in-hand ties of variable structure. The method consists in impressing creases in the fabric piece of which the tie is made along predetermined fold lines while the fabric piece is in unfolded condition, and subsequently folding the fabric along the crease lines and using tacking stitches to secure the folds together.

The invention as set forth herein which comprises a preferred type of four-in-hand tie is preferably manufactured in accordance with the method noted.

Regardless of the method employed in its manufacture, this application relates to the necktie itself and to its constructive features.

It is an object of my invention to provide a four-fold, three crease four-in-hand tie in which the fabric of the tie is so arranged that the use of a liner is obviated.

It is an object of my invention to provide a four-in-hand tie without a liner in which the edges of the folds are so arranged underneath the creases of exposed folds so that the tie may be pressed to its original shape without the formation of polished lines extending down the exposed face of the tie. What this means is essentially that when the tie is pressed, the central portion of the tie constituting the complete thickness of four folds will be the part that is compacted, whereas the margins beyond the four-fold thickness are not compacted. Thus, no lines are formed where the thickness drops off from four thicknesses to two thicknesses. So it is that by bringing the edges of the concealed layers close enough to the fold lines bounding the face of the tie, it is possible to press the tie without leaving any indented or polished lines, and it is also in this sense that the fold lines bounding the face of the tie conceal the underlying portions. Due to the fact that the tie is made of bias cut fabric, preferably having a decided resilience, the fold lines beyond the full thickness area will be rolled loosely, which gives the tie when repressed, the appearance of a new tie. The closeness which the underlying portions must have to the fold lines on the face of the tie, depends somewhat on the resilience of the fabric of the tie itself, and the amount of rolled effect which is natural to that type of fabric.

It is an object of my invention in a four-fold three crease four-in-hand tie to so arrange the fabric on the bias that no reinforcement at the neck band is required and so that the formation of wrinkles during the wear of the tie is materially lessened.

The above object and other objects to which reference will be made in the ensuing description, I accomplish by that certain combination and arrangement of parts of which I have shown a preferred embodiment.

Referring to the drawing:—

Figure 1:
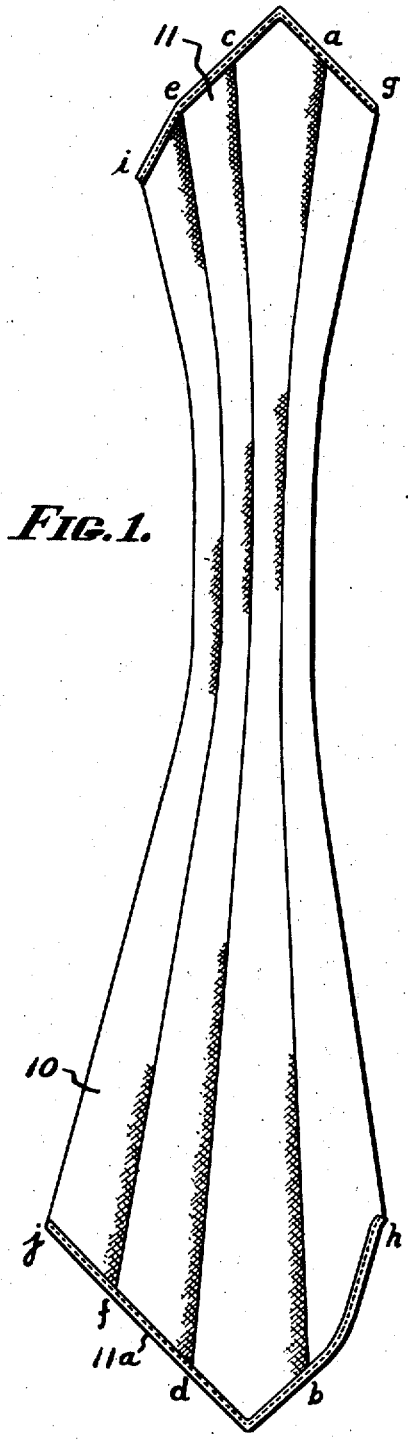
Fig. 1 is a plan view of a piece of material creased and ready for folding into my preferred type of tie.

Referring to the drawing, I have shown the tie material piece at 10 having diagonally cut ends 11, 11*a*, the end 11*a* being the portion which is larger and which will accordingly form the outside face or visible portion of the four-in-hand tie after it is adjusted about the collar of a wearer.

The tie illustrated has three lines of fold or creases *ab*, *cd*, and *ef*. These creases preferably are formed by a pressing operation but may be formed by pressing over forms in what has heretofore been the normal blocking process of the manufacture.

Figure 2:
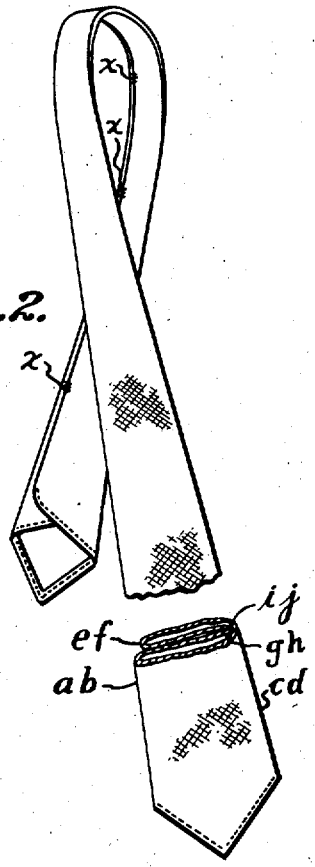
Fig. 2 is a perspective view of a finished tie made in accordance with my invention.

After the fabric has been creased or after it has had the crease lines indicated, the operator folds the fabric along the creases *ef* and *ab*. The double ply folds are then folded together along the creases *cd*. This will cause the edges *gh* of one side of the fabric piece and the edges *ij* of the other to lie in overlapped parallel arrangement extending along one of the edges of the finished tie as indicated in Fig. 2. The opposite edges of the tie will be formed by overlying layers, the outer layer being the fold along the crease *ab*, and the underlying folded layer the fold along the crease *ef*, so that when the tie is pressed the entire medial section, throughout substantially the length of the tie, will be free from any underlying edges or edge folds of fabric, so that the tie may be pressed without danger of developing shiny lines. The close proximity of the inner fold *ef* lies sufficiently close to the crease *ab* that the resiliency of the fabric at the crease *ab* prevents the development of a shiny line on the outer surface of the material registering with the crease *ef*.

The same thing is true with relation to the cut edges that underlie the fold lines. Here the added thickness of the tie lies between two plies constituting the face and the back of the tie, but here again the fold line with its roll conceals the enclosed extra thicknesses which underlie that edge of the face of the tie. Rolled edge creases, as clearly shown in the sectional view in Figure 2, are desirable from a point of view of appearance and as far as I am aware are unique as a result of a construction inherent in a tie made in accordance with my invention. Unless the edge *ef* is positioned fairly close to the edge *ab* the two unsupported plies of fabric folded at *ab* will not be sufficiently self sustaining not to curl up in the portion of the tie forming the tying loops of the four-in-hand bow. On the opposite side of the tie the underlying edges *gh* and *ij* support the creased edge *cd* so as to prevent it curling over in the medial portion of the tie and the rolled edge *cd* conceals the presence of the underlying edges *gh* and *ij*.

When highly resilient material such as "Palm Beach" cloth is used as the fabric, and the material is cut on the bias, not only is no lining required but the folds may be secured together with spaced bar tacks *x* along the creases *ef*, *ab*. With such a construction, there is no tendency for the tie to pull out or twist at the tie portion and the tie may be laundered and pressed without it being necessary to remove the stitches or bar tacks which hold the tie together.

Four substantial widths of material in the medial portion of the tie provide a balance construction which under pulling tension does not twist or distort the fabric. By the portion of the tie exposed to view when in use, I mean that part of the tie which extends out from the neckband portion and is visible when in use, and which forms the tying loops and extends down toward the pointed end of the tie as far as the stitching is required. The pointed end of the tie is often concealed by the wearer's vest or buttoned coat and is formed by folding in adjacent folds against the rear face of the pointed end in a triangular arrangement. No stitching is required in the pointed end. This portion of the tie is shown in the lower half of the tie illustrated in Fig. 3. It is this portion of the tie which must withstand the hardest usage. Once the fabric in this part of the tie is twisted and distorted and the edges curled the tie is ordinarily discarded. In a tie made in accordance with my invention strains incident to tying do not cause the material to buckle and twist, and curl at the edges, and repeated usage does not develop unsightly wrinkles in this portion of the tie.

As far as I am advised, no four-in-hand tie has previously been made of fabric cut on the bias with a three crease four-fold construction which extends substantially throughout the length of the tie and while with certain fabrics cut on the bias, no lining is required, I consider within the scope of my invention other ties folded in accordance with the preferred pattern illustrated even though, with some fabrics a reinforcing liner is provided in the neck band portion.

Figure 3:
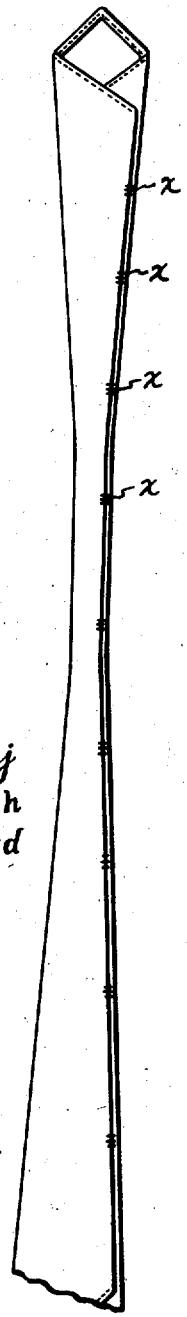
Fig. 3 is a perspective view of a finished tie laid out flat showing the spacing of the tacking stitches.

Referring now to Fig. 3, it will be observed that the tacking stitches are spaced substantially in equal distance apart. Assuming that the length of the tie is from 46 to 48 inches the tacking stitches are arranged medially in a space of about 32 inches and since there are nine tacks they average slightly more than three inches apart. The tacking stitches extend through both plies of the underlying fold of material but are only secured through the ply of the fold underlying the front face of the tie. Thus the tacking stitches are sufficiently spaced and the manner of inserting them is such that there is no tendency to cause the tie to buckle when stitched. There is as complete resilience as occurs in a tie having a loose lining secured with loose stitching.

In the claims which follow, the folding of the blank into the finished tie is explained by reference to that portion or width of the tie between the creases *cd*, *ab* as the first or exposed width; that portion between the crease *ab* and the side edge *gh* as the second width; that portion between the creases *cd* and *ef* as the third width and that portion between the creases *ef* and the side edge *ij* as the fourth width.

Having thus described my invention, what I claim as new and desire to secure by Letters Patent, is:

1. A four-in-hand tie comprising a piece of fabric cut on the bias and uniformly stretchable throughout its length and having three folding creases extending throughout the length of the tie along which creases the tie is folded into four approximately even widths producing four thicknesses of fabric throughout approximately the full width of that portion of the tie which is exposed to view when in use, the first width comprising the part exposed to view when in use, the second width attached to the first and folded back against it along one creased edge of said first width, the third width attached to the first and folded back along the other creased edge of the exposed width, the fourth width attached to the third and folded back along the other creased edge of said third width, the side edges of the second and fourth widths overlying each other substantially underneath and concealed by one edge crease of the exposed width, and the creased edge between the third and fourth width being spaced slightly inwardly from and thereby concealed by the other edge of the exposed width when in use.

2. A four-in-hand tie comprising a piece of fabric cut on the bias and uniformly stretchable throughout its length and having three folding creases extending throughout the length of the tie along which creases the tie is folded into four approximately even widths producing four thicknesses of fabric throughout approximately the full width of that portion of the tie which is exposed to view when in use, the first width comprising the part exposed to view when in use, the second width attached to the first and folded back against it along one creased edge of said first width, the third width attached to the first and folded back along the other creased edge of the exposed width, the fourth width attached to the third and folded back along the other creased edge of said third width, the side edges of the second and fourth widths overlying each other substantially underneath and concealed by one edge crease of the exposed width and the creased edge between the third and fourth width being spaced slightly inwardly from and thereby concealed by the other edge of the exposed width when in use, and stitches spaced substantially apart securing the creased edge between the third and fourth width to the second width.

3. A four-in-hand tie comprising a piece of resilient fabric cut on the bias and uniformly stretchable throughout its length and having three folding creases extending throughout the length of the tie along which creases the tie is folded into four approximately even widths producing four thicknesses of fabric throughout approximately the full width of that portion of the tie which is exposed to view when in use, the first width comprising the part exposed to view when in use, the second width attached to the first and folded back against it along one creased edge of said first width, the third width attached to the first and folded back along the other creased edge of the exposed width, the fourth width attached to the third and folded back along the other creased edge of said third width, the side edges of the second and fourth widths overlying each other substantially underneath and concealed by one edge crease of the exposed width, and the creased edge between the third and fourth width being spaced slightly inwardly from and thereby concealed by the other edge of the exposed width when in use.

4. A four-in-hand tie comprising a piece of resilient fabric cut on the bias and uniformly stretchable throughout its length, and having three folding creases extending substantially throughout the length of the tie along which creases the tie is folded into four widths overlying each other a substantial distance in the medial portion of the tie thereby producing four thicknesses of fabric of substantial width throughout the visible portion of the tie, the first width comprising the outer surface or exposure portion, the second width attached to the first and folded back against it along one creased edge of such first width, the third width attached to the first and folded back along the other creased edge of the exposure portion, the fourth width attached to the third and folded back along the other creased edge of said third width, said tie being further characterized in the medial and visible portion by the second and fourth widths being concealed within the fold between the outer and third width and the creased edge between the third and fourth width being secured along a line spaced inwardly from and thereby concealed by a rolled creased edge between the outer and second width.

5. A four-in-hand tie comprising a piece of resilient fabric cut on the bias and uniformly stretchable throughout its length, and having three folding creases extending substantially throughout the length of the tie along which creases the tie is folded into four widths overlying each other a substantial distance in the medial portion of the tie thereby producing four thicknesses of fabric of substantial width throughout the medial portion of the tie, the first width comprising the outer surface or exposure portion, the second width attached to the first and folded back against it along one creased edge of such first width, the third width attached to the first and folded back along the other creased edge of the exposure portion, the fourth width attached to the third and folded back along the other creased edge of said third width, said tie being further characterized in the medial and visible portion by the second and fourth widths being concealed within the fold between the first and third width and the creased edge between the third and fourth width being fastened along a line spaced inwardly from the creased edge between the first and second width a sufficient distance whereby said tie when pressed will have a rolled crease between the first and second width, and such rolled crease conceals the presence of the underlying creased edge between the third and fourth width, said spacing being insufficient to leave an unsupported fold of the first and second width which will curl at the edge in the bow tying portion.

6. A four-in-hand tie comprising a piece of resilient fabric cut on the bias and uniformly stretchable throughout its length, and having three folding creases extending substantially throughout the length of the tie along which creases the tie is folded into four widths overlying each other a substantial distance in the medial portion of the tie thereby producing four thicknesses of fabric of substantial width throughout the visible portion of the tie, the first width comprising the outer surface or exposure portion, the second width attached to the first and folded back against it along one creased edge of such first width, the third width attached to the first and folded back along the other creased edge of the exposure portion, the fourth width attached to the third and folded back along the other creased edge of said third width, said tie being further characterized in said medial and visible portion by the side edges of the second and fourth width being concealed within the fold between the first and third width and extending in substantial overlapping relation to a position sufficiently close to the creased edge between the first and third widths whereby said tie, after being pressed, has a rolled creased edge between said first and third widths and the presence of the underlying edges of the second and fourth width are thereby concealed, and the creased edge between the third and fourth width being held by stitching along a line spaced inwardly from the creased edge between the first and second width a sufficient distance whereby said tie when pressed will have a rolled crease between the first and second width, and such rolled crease conceals the presence of the underlying creased edge between the third and fourth width, and the closeness of the spacing of the side edges of the second and fourth width to the creased edge between the first and the third width and closeness of the spacing of the creased edge between the third and fourth width to the creased edge between the first and second width being sufficient to support the edges of the tie to prevent curling in the bow tying portion.

7. A four-in-hand necktie consisting of a single layer of fabric folded upon itself, said layer forming an elongated blank with respect to which the weave of the cloth is bias, said blank having three longitudinal creases throughout its length, dividing the blank into four parts as follows: a face portion, a back portion of substatnially equal width joined to the face portion, and two flaps joined respectively to the unjoined edges of the back and face portions, so that when said blank is folded on said creases to form a tie, said face and back portions both are bounded by folded edges, the line of fold between the back portion and its flap being secured along a line spaced inwardly of the line of fold between the face portion and its flap sufficiently to produce a rolled effect at the last mentioned line of fold when the tie is pressed, and one of said flaps at least being of such width as to cause said flap to form a liner for said tie, and of such width that its cut edge lies closely beneath the line of fold between the back and face portions so as to produce a rolled effect at said line of fold when the tie is pressed.

JACK WEISBAUM.